Oct. 29, 1929.  R. BIENAIMÉ  1,733,108
FASTENING DEVICE
Filed Feb. 28, 1928   3 Sheets-Sheet 1
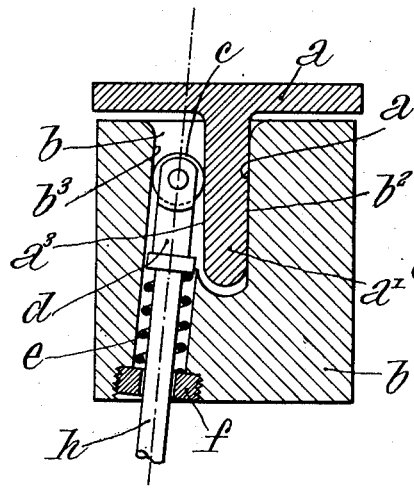
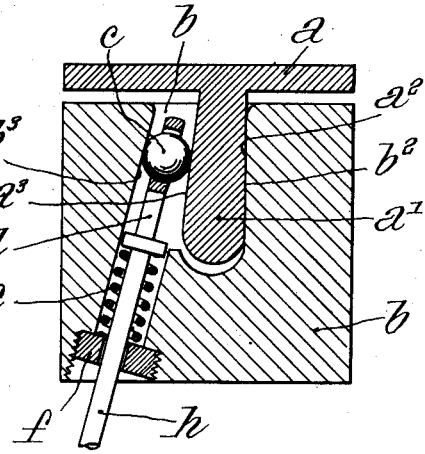
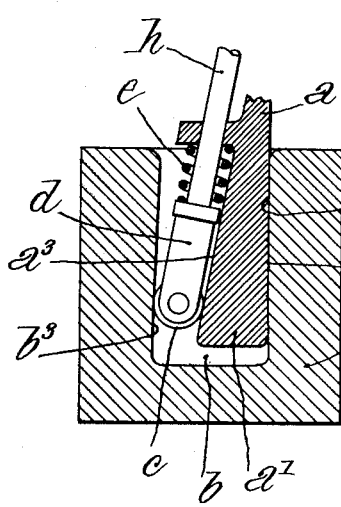
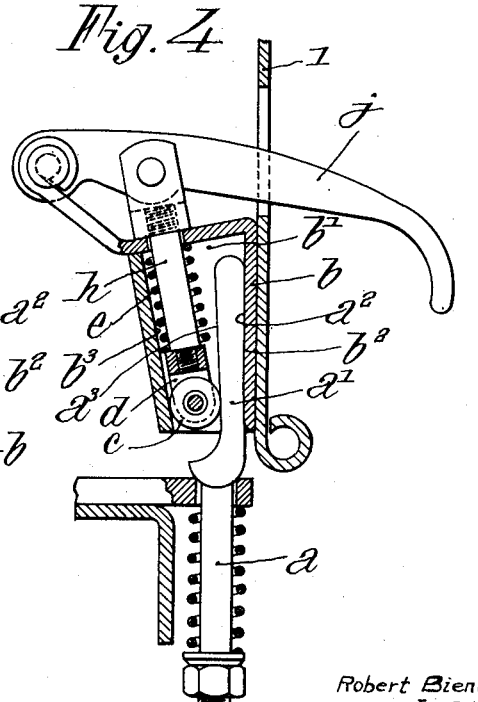
Robert Bienaimé
INVENTOR
Louis Barnett
ATTORNEY.

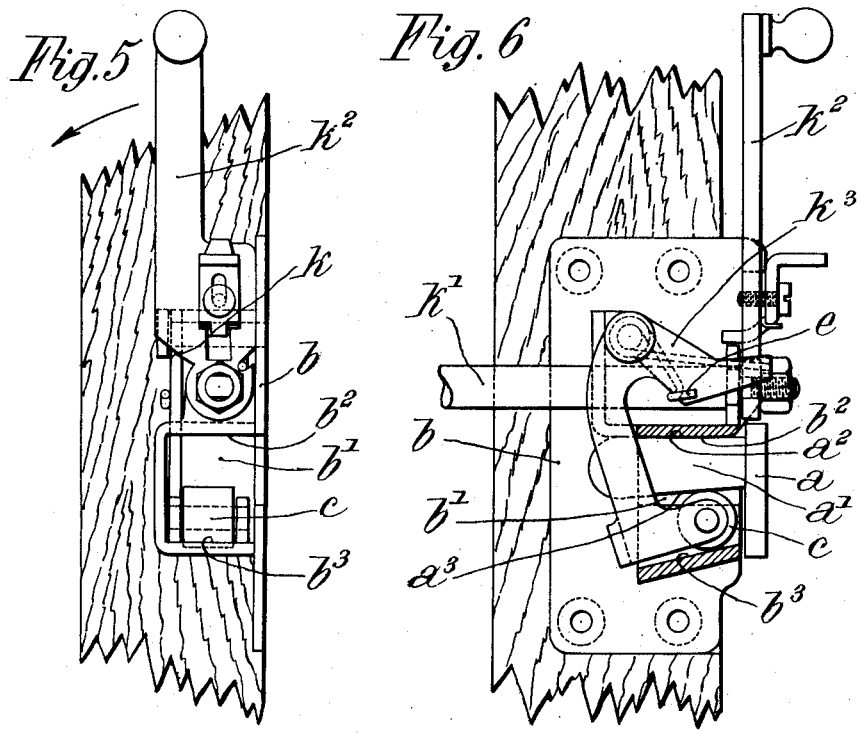
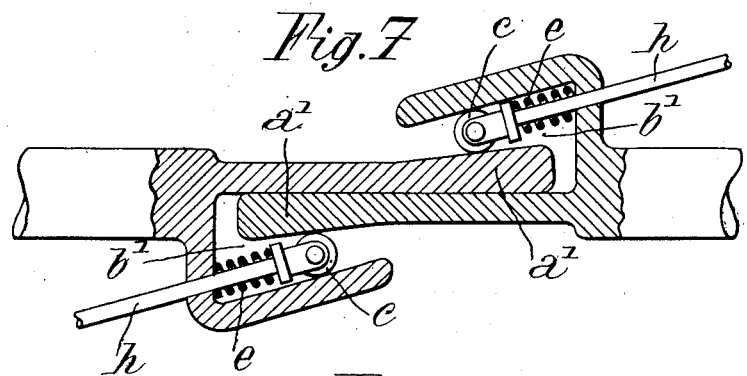
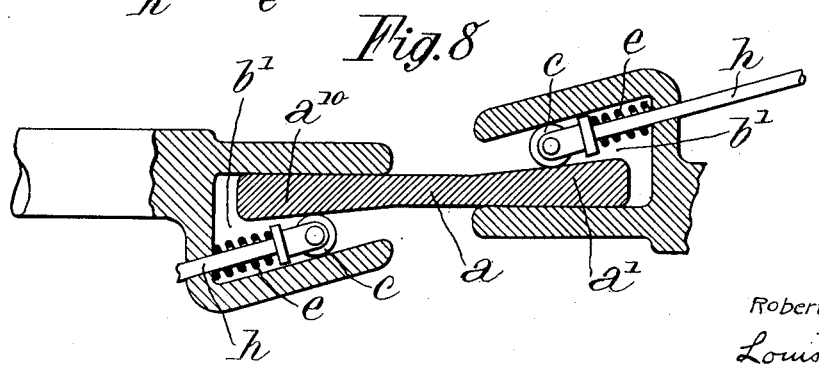

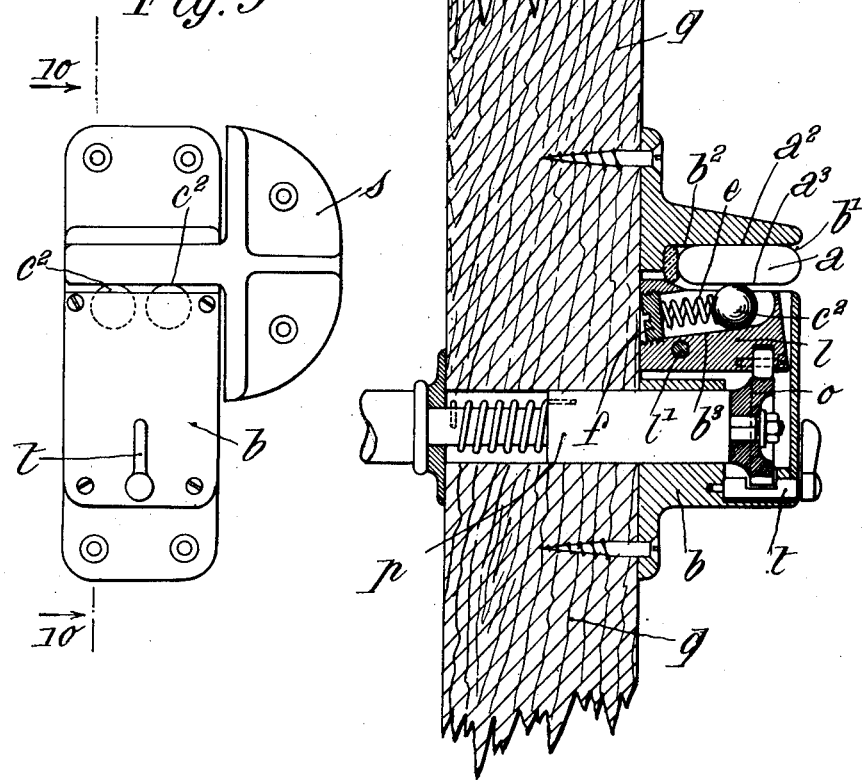

UNITED STATES PATENT OFFICE

ROBERT BIENAIMÉ, OF PARIS, FRANCE

FASTENING DEVICE

Application filed February 28, 1928, Serial No. 257,584, and in Belgium March 8, 1927.

The present invention relates to devices for detachably connecting two bodies together.

One of the objects of the invention is to provide a coupling or interlocking assembly including specially shaped male and female parts adapted to coact with one another and with a special form of interlocking element.

Further objects will appear in the course of the detailed description which will now be given with reference to the accompanying drawings, in which:

Fig. 1 is a section through one constructive embodiment of the invention;

Fig. 2 shows, in section, a second form of the invention;

Fig. 3 is a sectional view of a third locking device constructed in accordance with the invention;

Fig. 4 represents a section through a form of device especially adapted to be used for fastening automobile hoods in place;

Fig. 5 illustrates, in elevation with the bolt removed, another embodiment of the invention designed for use on automobile doors;

Fig. 6 is a side-view of the device represented in Fig. 5;

Fig. 7 shows, in section, a coupling for railway cars constructed in accordance with the invention;

Fig. 8 is a section through a second form of railway coupling;

Fig. 9 represents, in elevation, a form of door-lock differing somewhat from the one shown in Figs. 5 and 6; and Fig. 10 is a section taken on line 10—10 of Fig. 9.

Referring to the various figures of the drawings, there is shown a first body $a$ carrying a male element $a^1$, said body being designed to be coupled to a second body $b$ having a female portion $b^1$ formed therein adapted to receive male element $a^1$. Male and female elements are so formed that one face of each, $a^2$ and $b^2$ respectively, may offer a considerable contact surface for the other, while another pair of faces $a^3$ and $b^3$ limit an angular space adapted to receive a wedging element $c$ designed, when rammed into place, to intimately apply face $a^3$ against $b^3$. Element $c$ may take the form of a cylindrical roller as shown in Fig. 1 or that of a spherical ball as represented in Fig. 2, and is mounted on a support $d$ which tends to move element $c$ into wedging position under the action of a compression spring $e$ mounted on stem $h$ and bearing against properly formed abutting surfaces.

In the form of device shown in Fig. 1, faces $a^2$ and $a^3$ of element $a^1$ are made parallel and face $b^3$ shaped so as to form a proper wedging angle with $a^3$. Wedging element $c$ is forced into place under the pressure of spring $e$ and insures intimate frictional engagement between faces $a^2$, $b^2$. It will be noted that the faces $a^2$ and $b^2$ are forced into contact under a pressure which increases with the force tending to separate bodies $a$ and $b$. The tension of spring $e$ may be adjusted by rotating threaded abutment $f$. By exerting a pull on stem $h$, the wedging action of element $c$ may be suspended, and bodies $a$ and $b$ separated.

The device shown in Fig. 2 differs from that represented in Fig. 1 only in the relative slopes of faces $a^2$ and $b^2$, $b^3$ and $a^3$. Here $a^3$ diverges from $b^2$ (and $a^2$) and $b^3$ from $a^3$. Wedging action is obtained in the same manner as in the device shown in Fig. 1.

In the modification illustrated in Fig. 3, wedging element $c$ is supported in male element $a^1$ instead of in female element $b$, and is wedged between diverging surfaces $a^3$, $b^3$ by spring $e$ as in the structures already described.

The remaining figures of the drawings illustrate special applications of the constructive principles embodied in Figs. 1 to 3. Thus in the structure shown in Fig. 4,—a locking device for automobile hoods,—male member $a$ is supported resiliently or otherwise on the vehicle chassis while female member $b$ is rigidly attached to the internal surface of hood 1. A lever $j$ permits disengagement of wedge roller $c$ and the lifting of the hood in a single upward movement. To fasten the hood in place, it suffices only to press lever $j$ firmly downward. It will be noted that this device is a special application of the species shown in Fig. 2. It will be noted further that, if the slope of surface $a^3$ is properly chosen, incomplete closure of the hood will be corrected by the vibration of the vehicle which will cause gradual advancement of the male member $a^1$ into $b^1$.

Figs 5 and 6 show the form of interlocking assembly illustrated in Fig. 2 applied to a latch for automobile doors. Here, a member $a$ is mounted on the door frame and supports bolt (male element) $a^1$, while member $b$ constitutes the latch proper and is provided with a recess $b^1$ and a wedge roller $c$. Roller $c$ may be retracted by moving lever $k^2$ downward, when the door is to be opened from the inside, or by rotating a handle $k^1$ rigidly bolted to $k^2$, when it is desired to open from the outside. In either case, rotation of $k^2$ brings cam surface $k$ to bear on a bent lever $k^3$ which moves element $c$ out of wedging position. A spring $e$ automatically moves roller $c$ back into wedging position as soon as the door is closed.

Figs. 7 and 8 show a special application of the invention to a pair of interlocked members of the type of railway car couplings which are designed to be subjected to considerable tension. In the device shown in Fig. 7, each member of the couple is provided with a male element $a^1$ and a recess $b^1$ shaped and positioned so as to coact with a corresponding male element and recess in the other members, the two members being latched in position by a pair of wedge rollers $c$ arranged to be actuated into and out of wedging position either separately or simultaneously by any convenient form of actuating mechanism (not shown). The structure represented in Fig. 8 differs from that shown in Fig. 7 only in the design of male elements $a^1$, $a^1$ which are here replaced by an independent element $a^{10}$ having the same external shape and function as both of elements $a^1$, $a^1$ taken together. It will be noted that in Figs. 7 and 8, two devices of the type shown in Fig. 2 have been turned in opposite directions and their combined wedging action added.

Figs. 9 and 10 illustrate a latch for vehicle doors operating somewhat differently than the one shown in Figs. 5 and 6. Bolt $a$ is made integral with a supporting portion $s^1$ mounted on the door frame, while the female portion $b$ is formed in an appropriate block mounted on door $q$. Wedging elements $c^2$ are retracted to release bolt $a$ by an eccentric cam $o$ attached to rotatable handle $p$, said cam acting to oscillate one end of block $l$ about pivot $l^1$ as a center. Cam $o$ may be dogged in closed position by means of a dog $t$ of any convenient design.

It will be noted that, in each of the devices hereinabove described, the slopes of the wedging surfaces may be so chosen with reference to the direction of the force or forces acting to separate the two coupled bodies that the compression of wedge element $c$ becomes proportional to the sum of the slopes of the surfaces with which it contacts and the more violent the tendency to separate bodies $a$ and $b$ the greater will be the tendency for male element $a^1$ to remain into female element $b$.

The invention is not to be taken as being limited to the particular structures shown in each figure. Thus, in the various special applications illustrated in Figs. 4 to 10, which embody the constructive principle shown in Fig. 2, the design of the various operating elements may be modified to permit the use of structures of the type represented in Figs. 1 and 3; springs $e$ in Figs. 4 and 7 may be fitted with means for adjusting their tensions of the type shown in Figs. 1, 2 and 10; etc., etc.

What I claim is:

A device of the class described comprising a male element, a female element having a recess formed therein, said male and female elements, when assembled, being formed so as to present in section a pair of contacting surfaces adapted to offer frictional resistance to the relative movement of said male and female elements and a pair of wedging surfaces forming an angle with one another and separated by a wedging space, the wedging surface of the male element being inclined at an angle to its contacting surface; and wedging means adapted to be inserted into said wedging space between said pair of wedging surfaces.

In testimony whereof I have hereunto set my hand.

ROBERT BIENAIMÉ.